United States Patent
Tewinkle

(10) Patent No.: US 8,013,282 B2
(45) Date of Patent: Sep. 6, 2011

(54) SYSTEM FOR PROGRAMMING A PLURALITY OF CHIPS, SUCH AS PHOTOSENSOR CHIPS OR INK-JET CHIPS, WITH OPERATING PARAMETERS

(75) Inventor: Scott L Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 943 days.

(21) Appl. No.: 11/950,508

(22) Filed: Dec. 5, 2007

(65) Prior Publication Data

US 2009/0147113 A1    Jun. 11, 2009

(51) Int. Cl.
H01L 27/00 (2006.01)
H01L 31/00 (2006.01)
G01J 1/44 (2006.01)
H04N 5/235 (2006.01)

(52) U.S. Cl. .............. 250/208.1; 250/214 R; 250/214.1; 348/222.1

(58) Field of Classification Search ............... 250/208.1, 250/214.1, 214 R, 214 LS, 214 SW, 216; 348/241, 294–296, 300–304, 307–310, 222.1; 358/3.23, 461, 474, 450–453, 466, 482, 483; 257/203–204, 208–211, 226, 229, 257–259, 257/290–293, 431
See application file for complete search history.

(56) References Cited

U.S. PATENT DOCUMENTS

| | | | | |
|---|---|---|---|---|
| 4,977,304 A | * | 12/1990 | Ino et al. | 250/208.1 |
| 6,950,131 B1 | * | 9/2005 | Kleinhans et al. | 348/241 |
| 2006/0274174 A1 | | 12/2006 | Tewinkle | |
| 2006/0291008 A1 | | 12/2006 | Tewinkle et al. | |
| 2007/0029465 A1 | * | 2/2007 | Choi et al. | 250/208.1 |

OTHER PUBLICATIONS

U.S. Appl. No. 11/588,904, filed Oct. 26, 2006 by Scott L. Tewinkle et al—System for Programming a Plurality of Chips, Such As Photosensor Chips or Ink-jet Chips, With Operating Parameters.

* cited by examiner

Primary Examiner — Georgia Y Epps
Assistant Examiner — Don Williams
(74) Attorney, Agent, or Firm — Simpson & Simpson, PLLC

(57) ABSTRACT

An imaging system, such as for recording images as digital data, comprises a plurality of imaging chips. Each chip includes a plurality of imaging elements; a data-in input, the data-in input accepting control data of a first type and control data of a second type, the control data of each type having an effect on at least one operational aspect of the imaging elements; and a selection input, the selection input selectably causing the imaging chip to ignore control data in the data-in input. A data-in line is common to the data-in input of all imaging chips. By controlling the selection input to all chips, the chips can be loaded with control signals in parallel, or in serial, with control data specifically intended for each chip.

6 Claims, 4 Drawing Sheets

SYSTEM FOR PROGRAMMING A PLURALITY OF CHIPS, SUCH AS PHOTOSENSOR CHIPS OR INK-JET CHIPS, WITH OPERATING PARAMETERS

INCORPORATION BY REFERENCE

U.S. patent application Ser. No. 11/588,904, filed Oct. 26, 2006, is incorporated by reference in its entirety.

TECHNICAL FIELD

The present description relates to imaging chips, herein defined as chips that record images as digital data, such as photosensor chips, or produce images based on input digital data, such as laser emitting chips or ink-jet printheads.

BACKGROUND

Image sensor chips typically comprise a linear array of photosensors which raster scan an image-bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. One technique to create such a large array is to make the array out of several butted silicon chips. In one design, an array comprises 20 silicon chips, butted end-to-end, each chip having 372 active photosensors spaced at 600 photosensors per inch.

Besides photosensor arrays, there are other types of multi-chip systems useful in recording or making images. In xerographic systems, there can be provided "LED arrays," meaning chips in which a linear array of a laser emitters are used to discharge imagewise areas on a photoreceptor for xerographic printing purposes. Also, many designs of ink-jet printheads include, on a chip, a series of independently-addressable ink-jet emitters.

Whether an imaging chip is used for recording images or creating images, a common feature in such chips is the use of a shift register, the stages of the shift register being in various possible ways associated with the different "imaging elements" (e.g., photosensors, light emitters, ink-jet emitters, etc.), so that individual imaging elements can be addressed at various times, such as for image input or image readout.

In any multi-chip imaging system, there will be occasions when operating instructions or parameters are desired to be communicated to one or more chips in the system. In the case of a photosensor chip, such parameters may include offset and gain values, or duration of integration times. In other types of imaging chips, the parameters may include operating voltages or temperatures, or pulse durations. In different situations, it may be desired to communicate the same parameter data to all chips in a system, or to direct a parameter to a specific chip in a multi-chip system.

U.S. Published Patent Application 2006/0274174 and U.S. Published Patent Application 2006/0291008 each relate to directing data related to a desired operating parameter, such as a reference voltage level, or photosensor integration time, to a photosensor chip. U.S. patent application Ser. No. 11/588,904, filed Oct. 26, 2006, describes a system for directing image sensor control data, to each of a set of imaging chips using a shared wiring arrangement. In that application, the inputs DIN, PROG, and PCLK represent parts of what is known in the art as a "three-wire programming interface."

SUMMARY

According to one aspect, there is provided an imaging system, comprising a plurality of imaging chips. Each chip includes a plurality of imaging elements; a data-in input, the data-in input accepting control data of a first type and control data of a second type, the control data of each type having an effect on at least one operational aspect of the imaging elements; and a selection input, the selection input selectably causing the imaging chip to ignore control data in the data-in input. A data-in line is common to the data-in input of all imaging chips.

DETAILED DESCRIPTION

Figure 1A:
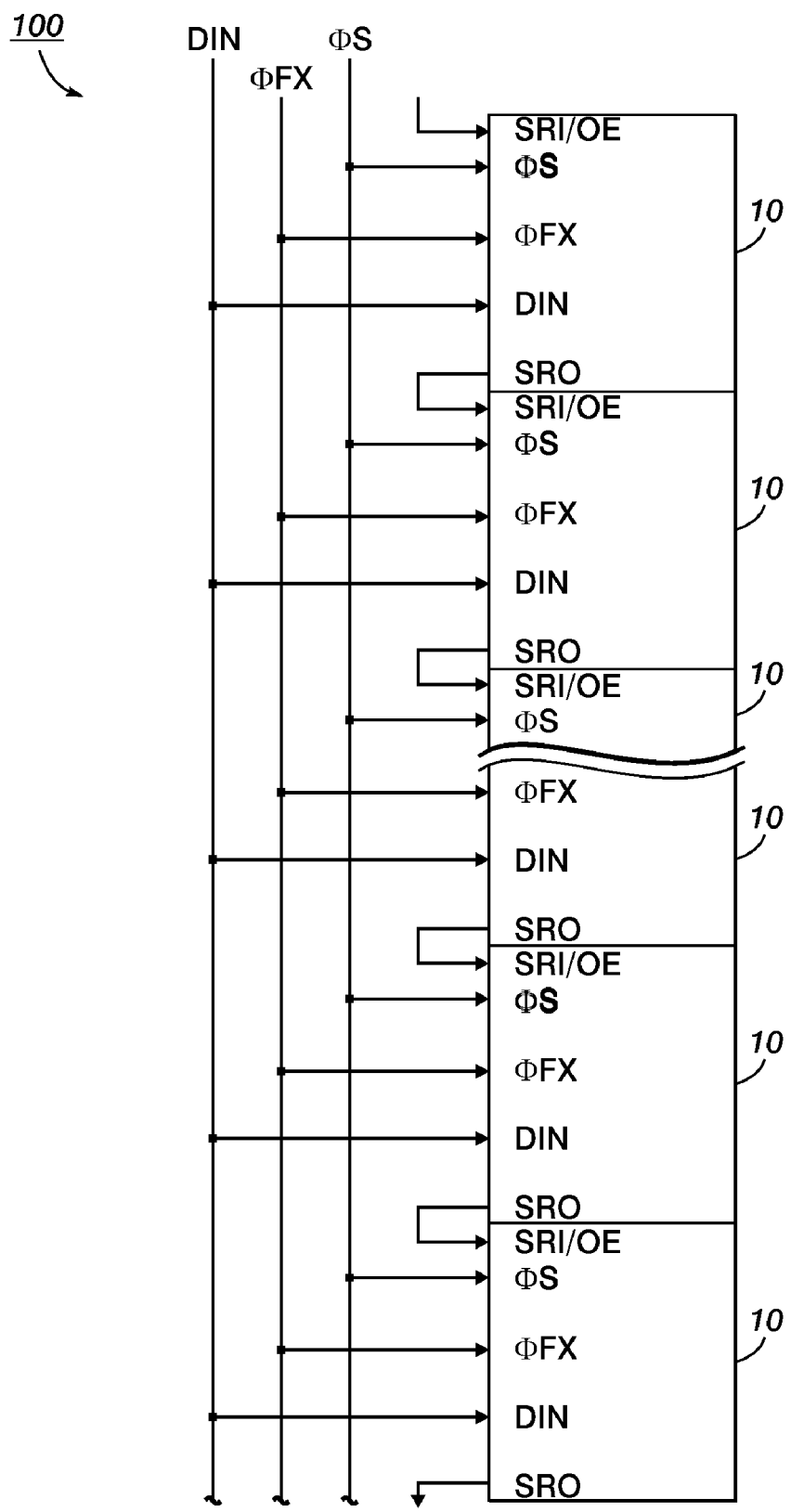
FIGS. 1A and 1B are simplified plan views of a system of multiple imaging chips and associated wiring, as would be found, for example, in a page-width photosensor array, LED array, or ink-jet printhead.
Figure 1B:
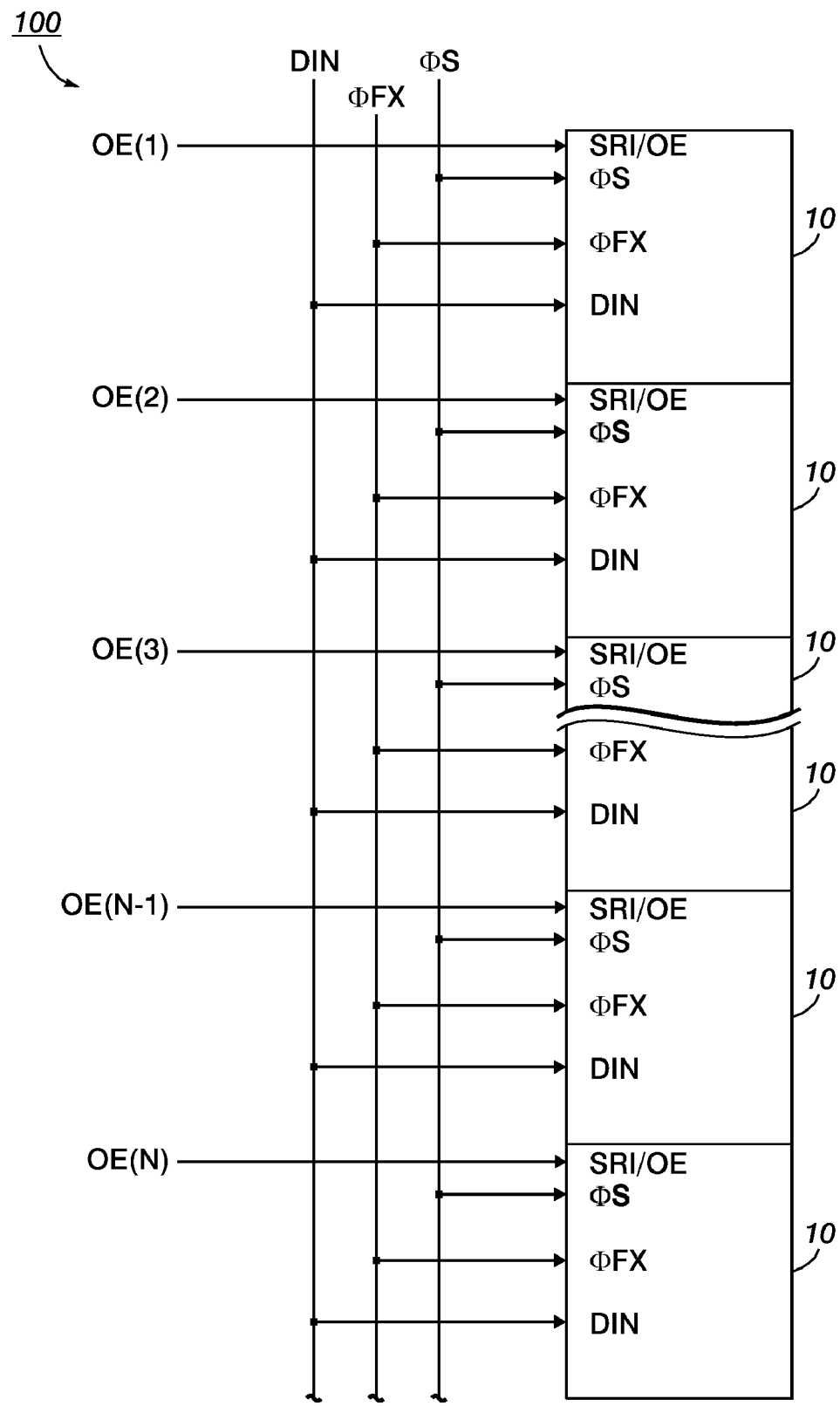

FIGS. 1A and 1B are simplified plan views of a system of multiple imaging chips and associated wiring, as would be found, for example, in a page-width photosensor array, LED array, or ink-jet printhead. Each chip 10 includes an array of imaging elements (not shown), examples of which are given above, typically a shift register (not shown) associated with the array of imaging elements, and a set of input and output lines that interact with circuitry on each chip, such as including a shift register. In the respective FIGS. 1A and 1B, the basic layout of the butted chips are the same, but each arrangement differs in the character of the wiring (such as on a printed circuit board) that enables all the chips to act in a coordinated manner. In a specific example, the chips 10 act in a coordinated manner in the sense that the shift register on each chip 10 can be made to cooperate with the shift registers in neighboring chips 10, so that the entire multi-chip system can act as though controlled by a single shift register.

In the FIGS. 1A and 1B, each chip 10 has the same set of input and output lines: SRI/OE, which is a shift-register-in, or output-enable, line; a clock line φS, which accepts an external clock signal, such as to help the passage of signals through the shift register; a data-in line DIN, which typically accepts inputs of control data (i.e., data relating to a desired operating parameter of the chip). The control line DIN can be used for applying any kind of control data to the chip, whether the chip is an image sensor chip, inkjet-printhead chip, LED imaging chip, etc. Most commonly, for an image-sensor chip, the control data on line DIN relates to controlling a predetermined voltage offset of video signals from the chip, or controlling the integration period for exposure cycles for a set of photosensors on the chip. In the FIG. 1A embodiment, there is provided on each chip 10 a shift register out line SROUT, which relates to the end of a the chip's shift register opposite that of the SRI/OE line so that a shift register output of first chip is directly connected to a shift register input of a second chip: in this way, the shift registers of adjacent chips can be in effect chained together to form a single shift register.

In FIGS. 1A and 1B, the basic layouts of the butted chips are the same, but each arrangement differs in the character of the wiring 100 (such as on a printed circuit board) that enables all the chips to act in a coordinated manner. In brief, the FIG. 1A wiring enables serial video control (i.e., the respective shift registers in each chip are linked together in series) with parallel programming (i.e., all of the DIN lines on the chips are connected to a common line); FIG. 1B enables parallel video control (i.e., each OE line is individually controllable) with parallel programming. Different wiring arrangements reflect different requirements of a larger system, such as a digital scanner or printer.

In various contexts, certain types of control data may be desired to be communicated to, and thereby control, all of the chips equally and simultaneously, while other types of control data may be desired to be communicated to, and thereby control, each chip specifically. In the scanner context, one parameter typically communicated to all chips equally and simultaneously is a selection of an output data format, for example, whether or not "reference" signals should be output along with video signals at readout. A parameter that would typically be communicated to each individual chip is a correction factor for an output voltage (since such a voltage will vary from chip to chip, and has to be compensated for in a larger system), or a fine-tuned integration time for at least a subset of photosensors on a given chip. The present disclosure describes a chip design in which control data can be entered over a single common line, and enter through the DIN port of each chip in a set of chips, either to all chips in parallel, or to individual chips as needed.

According to the present disclosure, the chip design enables a system in which a chip accepts through a single data-in input, here called DIN, both "serial" control data, i.e., data intended for a specific chip in a set of chips; and "parallel" control data, i.e., data intended to be communicated into all the chips in a set simultaneously, through a common line. Each type of control data, when applied to a given chip 10, has an effect on at least one operational aspect of the imaging elements, such as controlling integration time or video offset. In order for each chip to discriminate whether the data it is currently receiving on its DIN line is serial or parallel, there is provided at least one selection input, the condition of which selects whether the data is serial or parallel.

Figure 2:
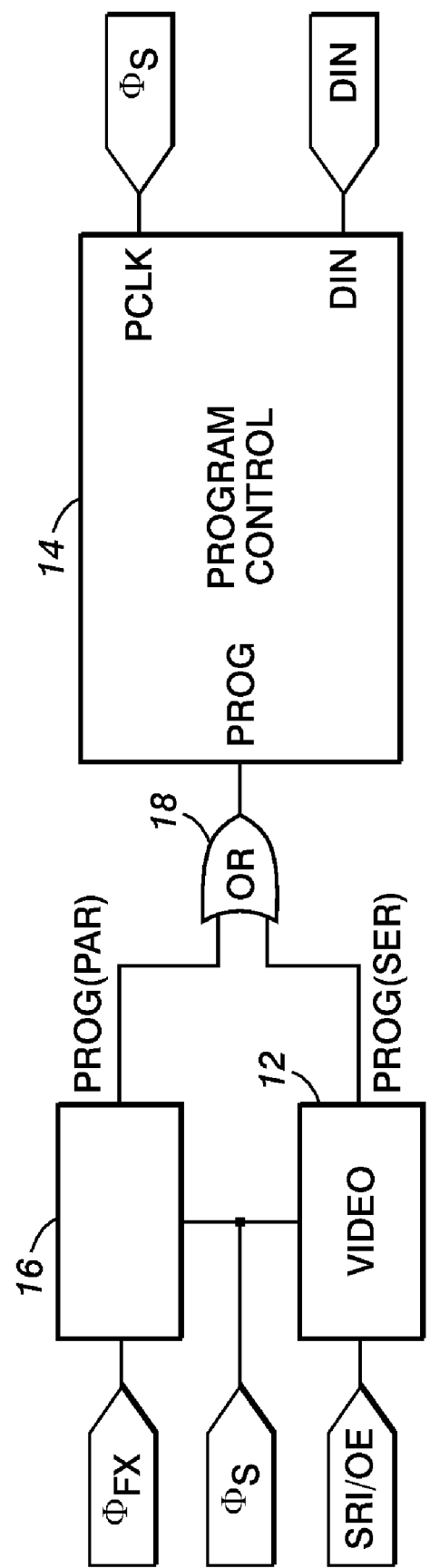
FIG. 2 is a schematic diagram of a portion of an imaging chip, according to an embodiment.

FIG. 2 is a schematic diagram of a portion of a chip 10, showing how the input and output lines as described above can operate in parallel or serial programming modes. In this embodiment, for each chip, there are a limited number of external inputs, which have been mentioned in regard to FIGS. 1A and 1B. In FIG. 2, the above-described input and output lines on a chip 10 are shown interacting with a video control module 12, a program control module 14, and an integration control module 16.

The video control module 12 outputs, in this embodiment, video readout and processing control signals. Typical among types of video control data is data relating to integration or exposure times of the photosensors while the chip is in operation, and other types of control data typically desired to be differently to each chip in a multi-chip system. The external inputs to video control module 12 are the system master clock φS, and a shift-register in/output enable line SRI/OE, analogous to the SRI/OE line in the chip in U.S. patent application Ser. No. 11/588,904, incorporated by reference above. If the SRI/OE lines among a plurality of chips 10 in a system are chained together in shift-register fashion, as in FIG. 1A above, the SRI/OE line acts as a shift-register-in line; if there are available independent output-enable lines in a larger system, such as in FIG. 1B above, the SRI/OE line acts as an output-enable line.

The program control module 14 ultimately outputs control data intended for an individual chip in a multi-chip system, such as, in the scanner context, a control over the video offset of the particular chip. The inputs to program control module 14 are the data-in line DIN (forming a "data-in input" to the chip), the system master clock φS, and a program line PROG, which will be described in detail below.

Also shown in FIG. 2 is an integration control module 16. In the present embodiment, a fence clock line φFX is associated with the integration control module 16 of each chip. The fence clock line φFX input acts as a selection input, as described above, to operate the particular chip to accept serial or parallel data (or, in effect, ignore data on the multi-chip system's DIN line that is not intended for that particular chip). The output of integration control module 16 is an "integration" signal PROG that will, in combination with a data-in number on line DIN, control the integration time for at least a selected subset of the photosensors on the chip 10. The line PROG is thus analogous to the external line PROG in the chip in U.S. patent application Ser. No. 11/588,904, incorporated by reference above. (In other types of chip 10, the "integration" signal could control a voltage, pulse timing, or other parameter for affecting, for instance, the behavior of at least a selected subset of imaging LED's or ink-jet ejectors.)

It will be noted, in FIG. 2, that the PROG input into program control module 14, via OR gate 18, can be either the video control signal from video control module 12, which is entered into all of the chips 10 in a system in serial fashion for serial programming PROG(SER); or the integration control signal from integration control module 16, which is entered into a selected one of the chips 10 in a system in parallel fashion for parallel programming PROG(PAR). In either case, the specific control data, e.g., the desired video offset or integration time, is entered through a common data-in line DIN on program control module 14; the program control module 14 on a particular chip 10 recognizes the input data on line DIN as being parallel or serial by virtue of the condition (basically, low or high) of its PROG line. In this way, a single data-in input DIN is used selectably for both parallel and serial programming of chip 10.

Figure 3:
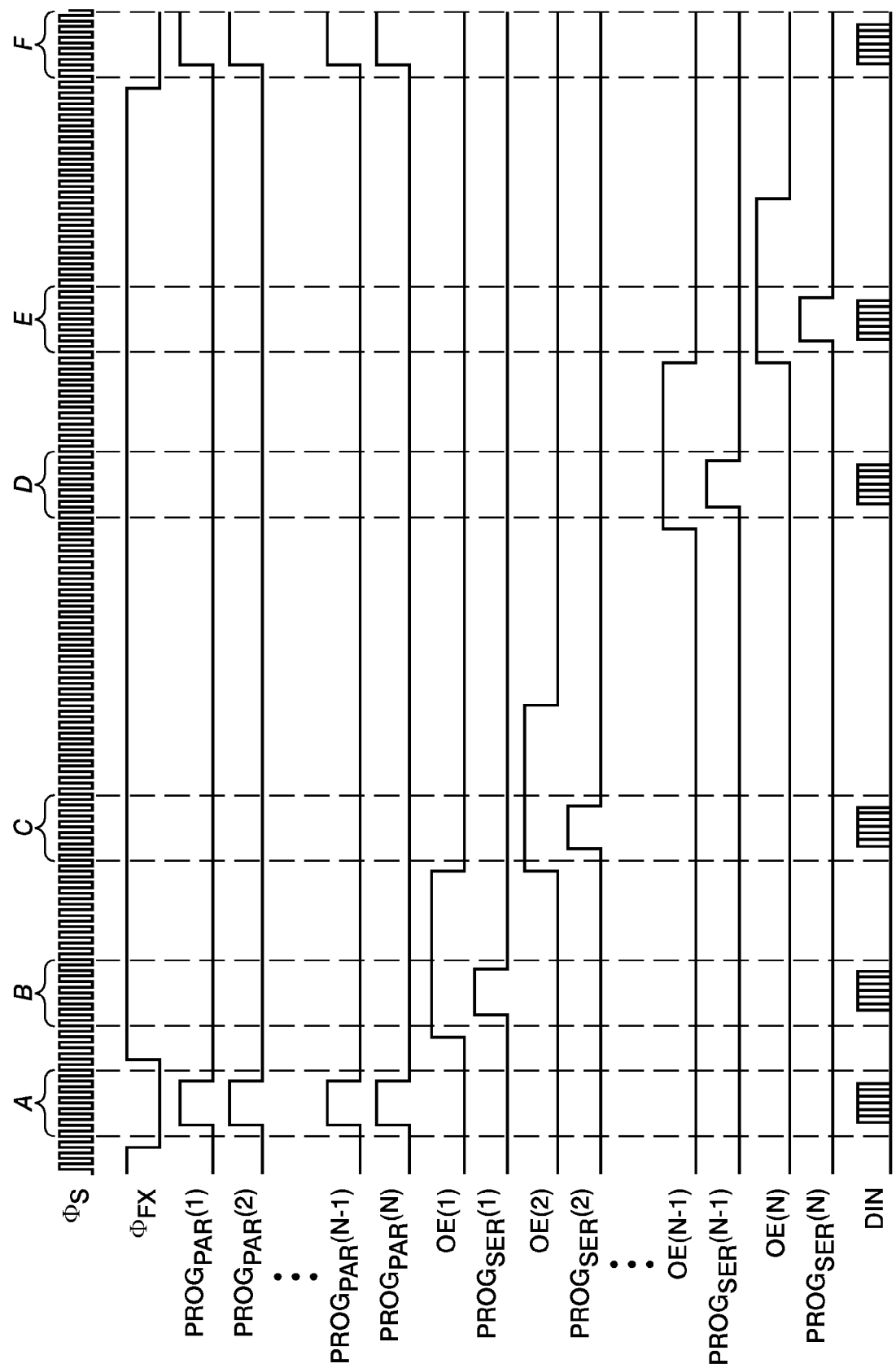
FIG. 3 is a comparative signal diagram showing a typical operation of the elements in FIG. 2.

FIG. 3 is a comparative signal diagram showing a typical operation of the elements in FIG. 2. The different portions of the illustrated operation, labeled A-F, are intended to represent one possible scenario of programming a set of chips 10 with parallel and serial data: in the diagram, the SRI/OE lines of each of a set of chips 10 are indicated as OE(1), OE(2), . . . . OE(N). In portion A, a parallel control is carried out equally on all chips 10: in this case, the φFX line is dropped to a low state, and the falling clock causes an effective selection of the PROG(PAR) line of each chip 10 in the system. While φFX is low, the necessary data for controlling, in this instance, integration time of at least a subset of photosensors (or, in other embodiments, LEDs or ink-jet ejectors), is applied to a common line for DIN shared by all of the chips 10, as shown in FIG. 1A or 1B. Following parallel programming of all chips 10, the line φFX is brought high again. In the illustrated embodiment, the falling of the φFX signal is specifically what causes the system to enter a parallel mode, as opposed to the signal simply being low; however, in other possible designs, the high or low status of the signal can determine the mode of the system.

In portions B-E, in each case a selected single chip 10 is in effect activated for application of control data through its line DIN; it should be remembered that, in the FIGS. 1A and 1B wiring arrangements, the DIN line is common to all chips 10 in the system. Thus, while all chips 10 can "hear" all control data on line DIN at all times, only when a given chip is activated through its SRI/OE line will the chip 10 actually use the data on the DIN line to affect its operation, and all chips 10 not activated at the time will in effect ignore the data on DIN. Thus, to apply control data to a specifically targeted chip 10, the SRI/OE line for that chip is temporarily raised high. Portions B-E show how specific individual chips are thus programmed through the common DIN line. In portion F, all of the chips 10 are again programmed in parallel through the common DIN line, as the φFX line is dropped.

In an embodiment having a set of full-color-sensitive input scanning chips, there can be three distinct types of fence clock signals, φFX, corresponding to independent integration control of red, green, and blue subsets of photosensors respectively in a chip.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An imaging system, comprising:
    a plurality of imaging chips, each chip including
        a plurality of imaging elements,
        a data-in input, the data-in input accepting control data of a first type and control data of a second type, the control data of each type having an effect on at least one operational aspect of the imaging elements, and
        a selection input, the selection input selectably causing the imaging chip to ignore control data in the data-in input; and
    a data-in line common to the data-in input of all imaging chips.

2. The imaging system of claim 1, wherein, when the selection input of an imaging chip is in a first predetermined state, the control data of a first type is ignored and the control data of the second type is operative of the chip, and when the selection input of an imaging chip is in a second predetermined state, the control data of a first type is operative of the chip and the control data of the second type is ignored.

3. The imaging system of claim 1, each chip including a shift register output, and further comprising:
    a shift register line connecting the imaging chips, whereby a shift register output of a first imaging chip is directly connected to a shift register input of a second imaging chip.

4. The imaging system of claim 1, the control data of the first type having an effect on an integration behavior of at least a subset of the imaging elements of the chip.

5. The imaging system of claim 1, the control data of the first type having an effect on a video offset associated with the chip.

6. The imaging system of claim 5, the control data of the first type having an effect on an image data output format associated with the chip.

* * * * *